United States Patent [19]
Zenkich

[11] Patent Number: 5,479,978
[45] Date of Patent: Jan. 2, 1996

[54] PRESSURE-VACUUM RELIEF VALVE ASSEMBLY

[75] Inventor: Elias R. Zenkich, Norridge, Ill.

[73] Assignee: Trans Tech Industries, Inc., Elk Grove Village, Ill.

[21] Appl. No.: 216,472

[22] Filed: Mar. 22, 1994

[51] Int. Cl.$^6$ .................................................. F16K 17/196
[52] U.S. Cl. ........................ 137/493.3; 137/469; 137/523
[58] Field of Search .............................. 137/493.3, 493.4, 137/493.5, 493.6, 469, 523

[56] References Cited

U.S. PATENT DOCUMENTS

| | | | |
|---|---|---|---|
| 1,326,124 | 12/1919 | Vischer | 137/493.6 X |
| 1,342,985 | 6/1920 | Cash | 137/493.4 |
| 2,133,200 | 10/1938 | Kenneweg | 137/493.3 |
| 2,295,486 | 9/1942 | Lebus . | |
| 3,127,907 | 4/1964 | Novak | 137/493.6 |
| 3,968,897 | 7/1976 | Rodgers . | |
| 4,498,493 | 2/1985 | Harris | 137/493.6 X |
| 4,805,663 | 2/1989 | Szlaga . | |
| 5,165,445 | 11/1992 | Vertanen . | |

FOREIGN PATENT DOCUMENTS

| | | | |
|---|---|---|---|
| 1433441 | 4/1976 | United Kingdom | 137/493.4 |
| 2004625 | 4/1979 | United Kingdom | 137/493.6 |

*Primary Examiner*—Robert G. Nilson
*Attorney, Agent, or Firm*—Wood, Phillips, VanSanten, Clark & Mortimer

[57] ABSTRACT

A combination pressure-vacuum relief valve assembly is provided for mounting in a port of a container. A two-part, generally hollow valve housing defines a valve chamber and includes a housing body part adapted for mounting in the port and which has an inlet communicating with the container. A housing cap part is secured to the body part and defines an outlet therebetween. A pressure valve seat is formed on the housing body part surrounding the inlet. A two-part, generally hollow pressure valve is movably mounted within the valve chamber and includes a valve body part for engaging the pressure valve seat. The valve body part includes a first vacuum relief passage communicating with the container through the inlet. A valve cap part is secured to the valve body part and includes a second vacuum relief passage communicating with atmosphere through the outlet. A first spring is provided in the pressure valve and is operatively associated with the housing, outside the pressure valve, for yieldably biasing the pressure valve against the pressure valve seat. A vacuum relief valve seat is formed on the pressure valve surrounding the second vacuum relief passage. A vacuum relief valve is movably mounted within the generally hollow pressure valve for engaging the vacuum relief valve seat. A second spring is provided in the pressure valve for yieldably biasing the vacuum relief valve against the vacuum relief valve seat.

10 Claims, 3 Drawing Sheets

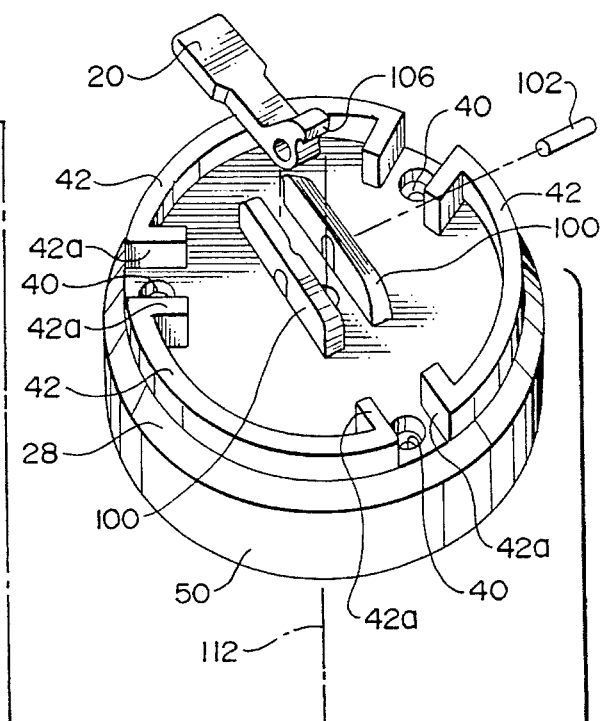
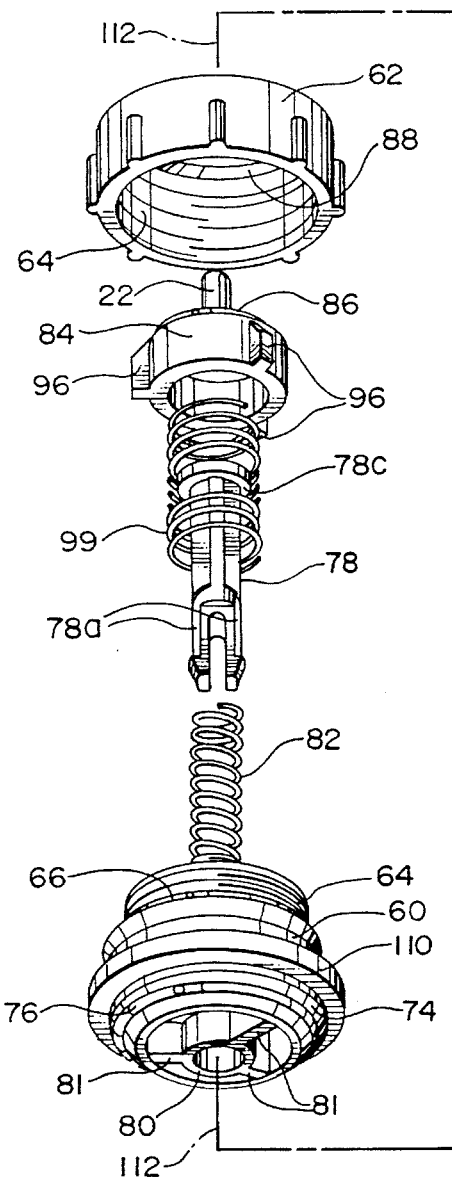
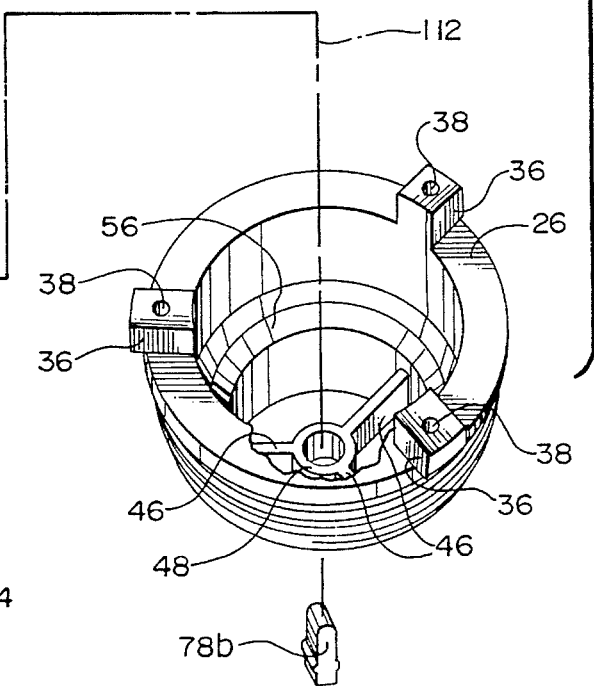
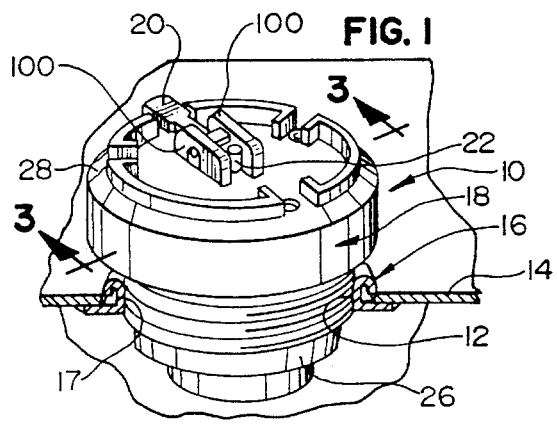
FIG. 1
FIG. 2

PRESSURE-VACUUM RELIEF VALVE ASSEMBLY

FIELD OF THE INVENTION

This invention generally relates to the art of valve assemblies and, particularly, to a combination pressure-vacuum relief valve assembly.

BACKGROUND OF THE INVENTION

Valving systems are used with various containers, such as chemical storage tanks, vehicle fuel tanks and the like, for regulating the discharge of pressurized gases or vapor from the container, such as when the container temperature becomes elevated or during filling. In addition, valving systems have been used on such containers for relieving vacuum conditions therewithin when the pressure within the container becomes excessively low in relation to the atmospheric pressure. In some applications, a separate valve assembly is used for regulating the discharge of pressurized vapor from the container, and another independent valve assembly is used to relieve excessive vacuum in the container. Using separate valve assemblies to perform the two separate functions is expensive. In addition, such a system doubles the potential for leakage problems in the areas of the valve assemblies which normally are mounted within ports formed in the container walls.

Therefore, various valve assemblies have been designed as a combination pressure and vacuum relief vent device which provides both high flow rates of pressure relief as well as negative pressure or vacuum relief, all through a single port in the container wall. Such combination valve assemblies are considered "two-in-one" pressure and vacuum relief vent devices. They normally are self actuating. In other words, the device opens to provide high flow rates for pressure relief and closes when the pressure falls below a given amount. Vacuum relief is provided at a predetermined or set negative pressure or vacuum condition and allows a relatively high flow rate of make-up air to enter the container, such as during emptying or reductions in ambient temperatures.

When comparing the separate valve systems with the "two-in-one" valve assemblies, the separate valves, individually, were more simple and reliable, but that very factor has been a continuing problem with "two-in-one" valve assemblies in other words, a combination pressure and vacuum relief vent device may be less expensive to manufacture and install than two separate pressure and vacuum relief valves, but the very combination of the two functions in a single device renders the two-in-one valve assembly quite complex. Prior combination valve assemblies incorporate an unduly number of moving pans which are prone to damage, wear and/or malfunctioning. The present invention is directed to solving these problems by providing an extremely simple combination pressure and vacuum relief vent valve assembly which includes a minimum number of parts and includes a number of features not heretofore available.

SUMMARY OF THE INVENTION

An object, therefore, of the invention is to provide a new and improved pressure-vacuum relief valve assembly of the character described above, for mounting in a port of a storage container or tank, for instance.

In the exemplary embodiment of the invention, the valve assembly includes a two-pan, generally hollow valve housing defining a valve chamber and including a housing body part adapted for mounting in the port and having an inlet communicating with the container. A housing cap part is secured to the body part and defines an outlet therebetween. A pressure valve seat is formed on the housing body part surrounding the inlet.

A two-part, generally hollow pressure valve is movably mounted within the valve chamber and includes a valve body part for engaging the pressure valve seat and moving off the seat when the container pressure exceeds a given amount. The valve body part includes a first vacuum relief passage communicating with the container through the inlet in the housing body part. A valve cap part is secured to the valve body part and includes a second vacuum relief passage communicating with atmosphere through the outlet in the valve housing. A vacuum relief valve seat is formed on the valve cap part surrounding the second vacuum relief passage. A first spring is provided in the pressure valve for yieldably biasing the pressure valve against the pressure valve seat.

A vacuum relief valve is movably mounted within the generally hollow pressure valve for engaging the vacuum relief valve seat. The vacuum relief valve moves off the seat when the container pressure is less than the forces applied by a second spring provided in the pressure valve for yieldably biasing the vacuum relief valve against the vacuum relief valve seat.

As disclosed herein, the center of the port in the container defines a generally central axis of the valve assembly. The pressure valve seat and the vacuum relief valve seat are concentric with the axis, and the pressure valve and the vacuum relief valve are mounted for reciprocating movement on the axis. The two springs are coil springs mounted concentrically on the axis.

The valve housing and the pressure valve therewithin define a flow passage between the inlet and the outlet, and a feature of the invention includes an impingement means on the pressure valve projecting into the flow passage and against which gas from the container impinges to assist in maintaining the pressure valve off the pressure valve seat. The flow passage is of a given cross-sectional area, and the impingement means is of a size and configuration to provide a restriction which considerably reduces the cross-sectional area of the flow passage. As disclosed herein, the pressure valve seat and the pressure valve are circular; the flow passage is generally cylindrical; and the impingement means is provided by an annular flange projecting radially outwardly of the pressure valve into the flow passage.

Another feature of the invention involves the provision of a valve stem on the vacuum relief valve, projecting through apertures in the valve cap part and the housing cap part, to facilitate selective actuation of the vacuum relief valve from outside the valve assembly. An actuating lever is pivotally mounted between a pair of flanges on the outside of the housing cap part, the lever being engageable with the valve stem for operating the vacuum relief valve. The flanges are sized and configured to provide guiding support for opposite sides of the lever during its pivotal movement.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures lane in which:

FIG. 1 is a perspective view of the combination pressure-vacuum relief valve assembly of the invention, mounted within a port of a container;

FIG. 2 is an exploded perspective view of the components of the valve assembly;

DETAILED DESCRIPTION OF THE PREFERRED EMBODIMENT

Figure 3:
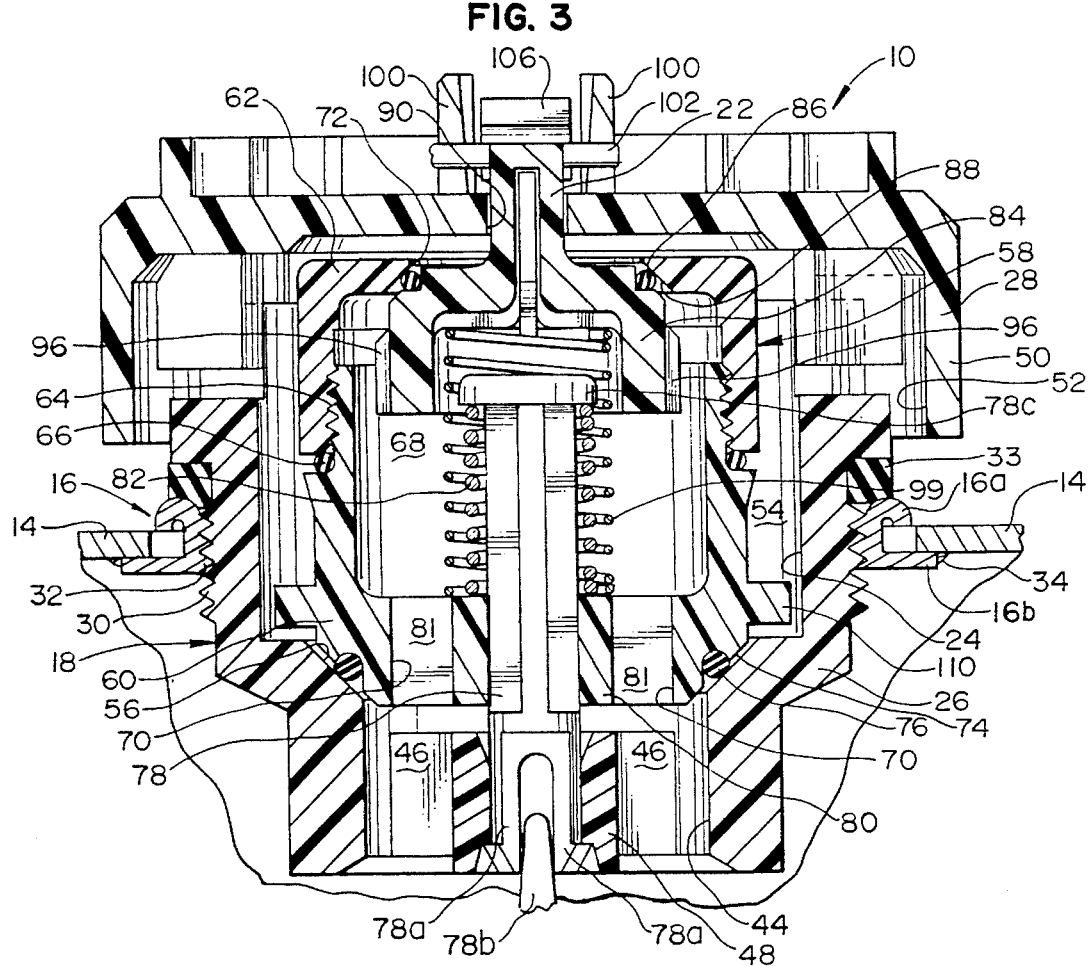
FIG. 3 is a vertical section, on an enlarged scale, taken generally along line 3—3 of FIG. 1, with the valve assembly completely closed.

Referring to the drawings in greater detail, and first to FIG. 1, the invention is embodied in a combination pressure-vacuum relief valve assembly, generally designated 10, mounted within a port 12 of a wall 14 of a container. Actually, port 12 is provided by a bung flange, generally designated 16, secured within a hole 17 in the container wall, as described hereinafter. The valve assembly includes a two-part valve housing, generally designated 18, which forms the exterior of the assembly. A manual actuating lever 20 is shown in FIG. 1 for depressing a vacuum relief valve stem 22 projecting upwardly of the valve housing, as will be described in greater detail hereinafter. Generally, pressure-vacuum relief valve assembly 10 is designed for regulating the discharge of pressurized gas or vapor from within the container. The assembly also provides for selective relief of a negative pressure or vacuum within the container.

More particularly, referring to FIGS. 2 and 3 in conjunction with FIG. 1, pressure-vacuum relief valve assembly 10 includes valve housing 18, as stated above. The valve housing is a two-part, generally hollow structure defining a valve chamber 24. The two-part housing includes a housing body part 26 and a housing cap part 28. The housing body part has an external threaded area 30 for threadingly engaging internal threads 32 of bung flange 16 to mount the valve assembly within hole 17 in container wall 14. A resilient O-ring seal 33 is compressed between the bung flange and the housing body part when those two components are threadingly engaged. The bung flange has an outside curved lip 16a for engaging the outside surface of container wall 14 and a flat interior flange 16b which is welded to the inside of the container wall, as at 34. As best seen in FIG. 2, three bosses 36 project upwardly from housing body part 26 and each boss has an internally threaded bore 38.

Housing cap part 28 of the two-part valve housing 18 includes three holes 40 through which threaded fasteners, such as bolts (not shown), are freely inserted for threading engagement within bores 38 of housing body part 26 to hold the two-part valve housing in assembled condition. Still referring to FIG. 2, an annular rigidifying structural flange 42 projects upwardly from housing cap part 28, and the annular flange is interrupted by structural flange portions 42a on opposite sides of holes 40.

Still referring to FIGS. 2 and 3, housing body part 26 has an inlet 44 communicating with the interior of the container. As seen best in FIG. 2, inlet 44 is defined between three radiating flanges 46 which terminate at the center of the body part integrally with a cylindrical hub 48.

As seen best in FIG. 3, housing cap part 28 includes a circular peripheral flange 50 which, in a radial direction, is larger than the adjacent area of housing body part 26 to define an outlet 55 between the two housing parts 26 and 28 communicating with atmosphere outside the container. A passage 54 is provided between the two housing parts 26 and 28 and communicates between inlet 44 and outlet 52 as will be seen hereinafter. Lastly, housing body part 26 is configured to form a frusto-conical pressure valve seat 56 at the lower end of passage 54.

A two-part, generally hollow pressure valve, generally designated 58, is movably mounted within valve chamber 24 of two-part valve housing 18. The two-part pressure valve 58 includes a valve body part 60 and a valve cap part 62 threadingly assembled to the valve body part, as at 64, with an O-ring seal 66 therebetween. The two valve parts 60 and 62 define an interior cavity 68. The valve body part 60 includes a first vacuum relief passage 70, and the valve cap part 62 includes a second vacuum relief passage 72, whereby the passages define a vacuum relief flow path axially through the entire two-part pressure valve 58. The lower end of pressure valve body part 60 is formed with a frusto-conical exterior valve surface 74 mounting a resilient O-ring valve seal 76 for engaging pressure valve seat 56 on the inside of housing body part 26.

A pressure valve shaft 78 extends through a cylindrical hub portion 80 of pressure valve body part 60 and through cylindrical hub 48 of housing body part 26. Flanges 81 radiate outwardly of hub portion 80 on the interior of the pressure valve body part 60. As best seen in FIG. 2, shaft 78 has a bifurcated lower end which defines resilient hook-shaped legs 78a for snappingly engaging beneath hub 48 to fix the shaft axially in position relative to housing body part 26, but pressure valve part 60 can move axially relative to the shaft. A wedge 78b then is press-fit into the bifurcated lower end of shaft 78 between legs 78a to prevent inward movement of the legs and positively lock the shaft in position. A coil spring 82 surrounds shaft 78 and is sandwiched between a head portion 78c of the shaft and hub 80 of pressure valve body part 60. Therefore, the spring 82 is effective to bias pressure valve 58 and particularly valve seal 76 against valve seat 56.

Figure 6:
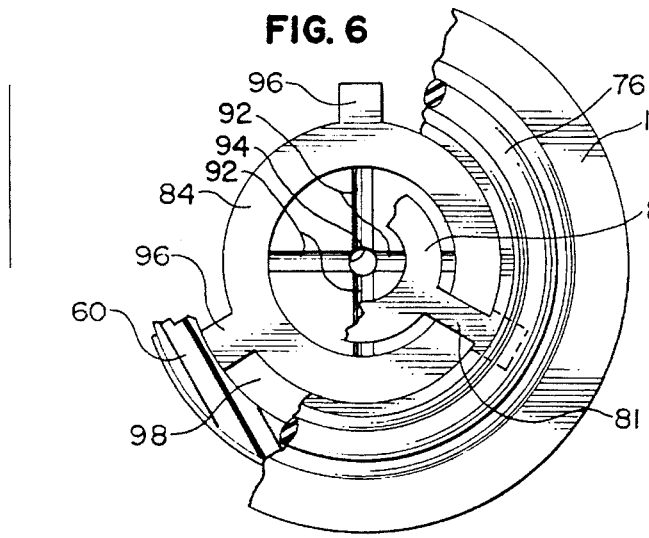
FIG. 6 is a bottom plan view of the pressure valve, partially cut away to show a bottom plan view of the vacuum relief valve.

A vacuum relief valve 84 is mounted within cavity 68 of pressure valve 58 and includes a resilient O-ring valve seal 86 for engaging a frusto-conical vacuum relief valve seat 88 formed on the inside of pressure valve cap part 62. The vacuum relief valve 84 is effective to close vacuum relief passage 72. Valve stem 22, which was described above in relation to FIG. 1, can be seen in FIG. 3 to extend upwardly through an aperture 90 in housing cap part 28. FIG. 6 shows that the inside of vacuum relief valve 84 has a plurality of radially extending grooves 92 terminating inwardly at a hole 94. The grooves are for molding purposes, and the hole prevents valve stem 22 from shrinking during curing. It can be seen in FIG. 6 that the vacuum relief valve 84 has a plurality of ribs 96 radiating outwardly therefrom for engaging the inside of pressure valve body part 60 to define passage areas 98 therebetween and establish communication past the vacuum relief valve 84 between vacuum relief passages 70 and 72 (FIG. 3) at the bottom and the top of pressure valve 58.

A second coil spring 99 surrounds coil spring 82 and is sandwiched between vacuum relief valve 84 and flanges 81 of the pressure valve body part 60. Spring 99 is effective to bias the vacuum relief valve 84 and particularly valve seal 86 against valve seat 88.

Figure 7:
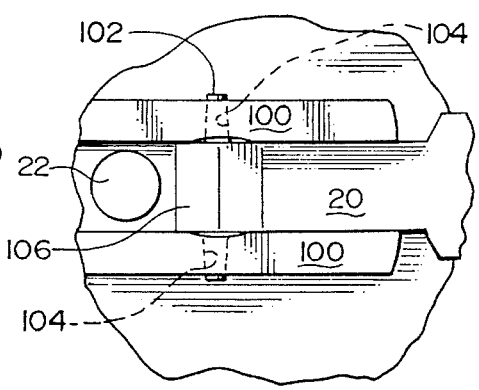
FIG. 7 is a fragmented top plan view of the area where the actuating lever engages the top of the vacuum relief valve stem.

Referring to FIG. 7 in conjunction with FIGS. 1 and 2, manual actuating lever 20 is pivotally mounted between a pair of flanges 100 molded integrally with and projecting upwardly from housing cap part 28. The lever has a pivot pin 102 projecting therethrough and into a pair of pivot holes 104 on the inside of flanges 100. The lever has an abutment portion 106 for engaging the top of vacuum relief valve stem 22. Therefore, as the lever is pivoted away from its position shown in FIGS. 1, 2 and 7, abutment portion 106 will engage the top of valve stem 22 and drive the valve stem inwardly, causing vacuum relief valve 84 to move off of vacuum relief valve seat 88. Flanges 100 guide and support the lever in its pivotal movement.

Figure 4:
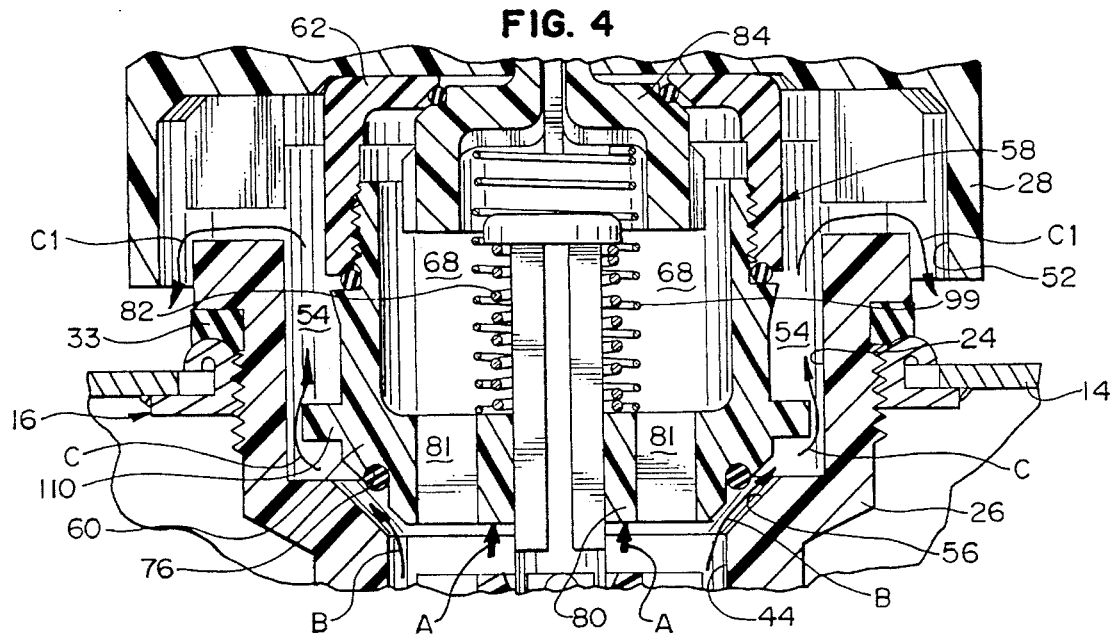
FIG. 4 is a view similar to that of FIG. 3, with the pressure valve open.

The operation of combination pressure-vacuum relief valve 10 now will be described. As stated above, FIG. 3 shows the condition of the valve when both pressure valve 58 and vacuum relief valve 84 are in closed positions. When the pressure within the container reaches a level whereby the pressure forces on pressure valve 58, as indicated by arrows "A" in FIG. 4, exceeds the biasing forces of coil spring 82, the pressure valve will lift off of valve 84 seat 56 as seen in FIG. 4. Pressurized gases from within the container will flow past the pressure valve through inlet 44 as indicated by arrows "B", through passage 54 as indicated by arrows "C" and through outlet 52 as indicated by arrows "C1". The pressure within the container will release through the valve assembly, as described, until the pressure forces within the container drop back below the biasing forces of spring 82.

Figure 5:
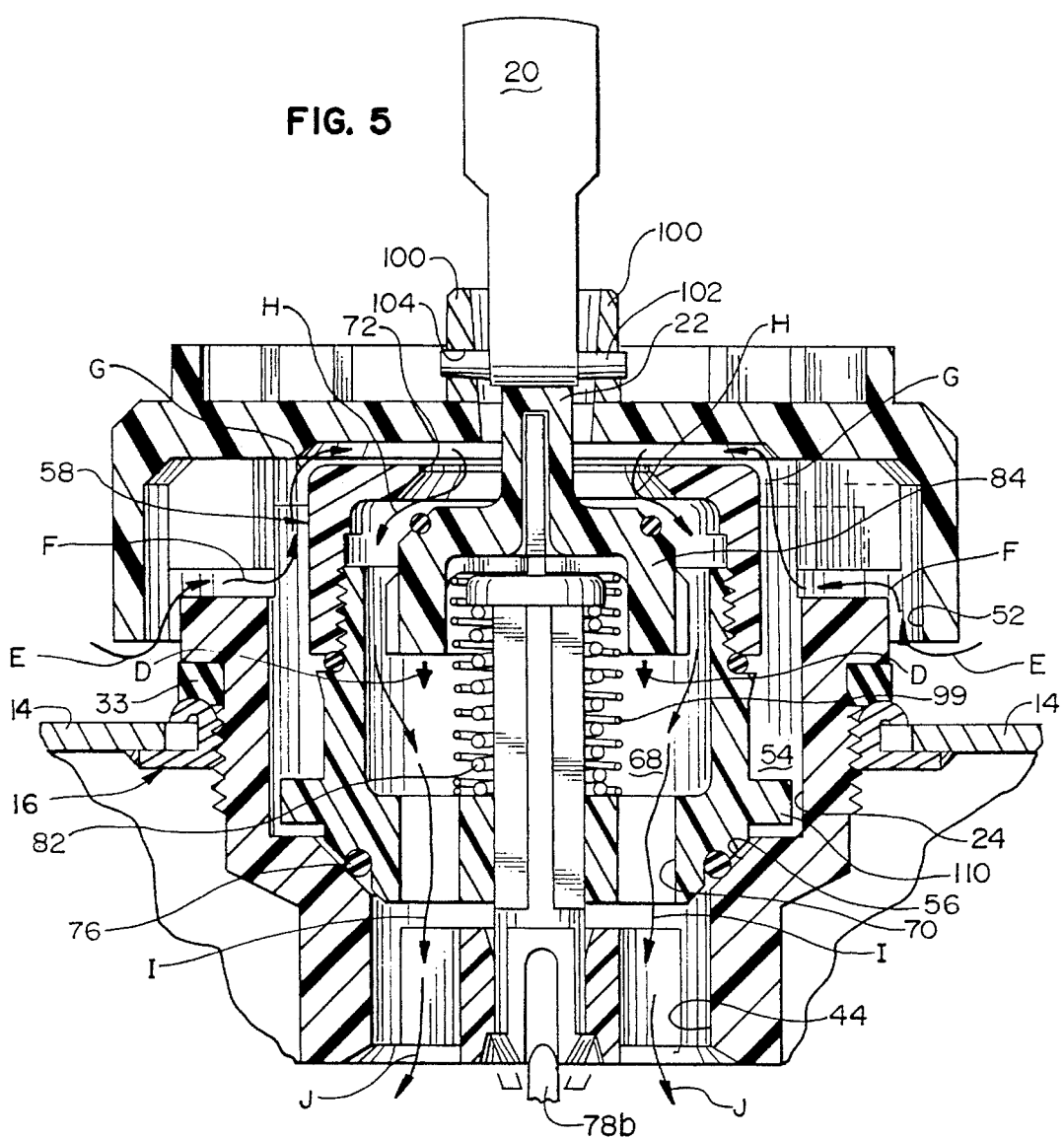
FIG. 5 is a view similar to that of FIGS. 3 and 4, with the vacuum relief valve open.

Whenever it is desirable to selectively relieve a negative pressure or vacuum condition within the container, an operator pivots actuating lever 20 upwardly approximately 90° from the position shown in FIG. 1 to the position shown in FIG. 5, whereupon abutment portion 106 of the lever engages the top of valve stem 22 and moves vacuum relief valve 84 downwardly in the direction of arrows "D" as seen in FIG. 5, against the biasing of coil spring 99. In this open condition of the vacuum relief valve, pressurized gases enter outlet 52 in the direction of arrows "E" and into passage 54 in the direction of arrows "F". However, since pressure valve 58 is closed at pressure valve seat 56, the pressurized gases will travel in the direction of arrows "G" around the top of the pressure valve 58 and through vacuum relief passage 72 in the direction of arrows "H". The pressurized gases will flow through the pressure valve 58, through vacuum relief passage 70 in the direction of arrows "I" and into the container through inlet 44 in the direction of arrows "J".

Aside from selective relief of negative pressure within the container, when the vacuum forces within the container exceed the biasing forces of coil spring 99, vacuum relief valve 84 will move off of vacuum relief valve seat 88.

Another feature of the invention is the provision of means for assisting in maintaining pressure valve 58 open as gases escape from the container through the valve assembly. More particularly, FIGS. 3–6 all show that a circular flange 110 projects radially outwardly from pressure valve body part 60 into passage 54 between pressure valve 58 and the inside walls of valve chamber 24. In effect, with flow passage 54 having a given cross-sectional area, flange 110 creates a restriction which considerably reduces the cross-sectional area about the periphery of the flange 110 and between the flange 110 and the adjacent valve chamber walls. Pressurized gases effectively impinge upon the flange 110 as indicated at arrows "C" in FIG. 4 and give pressure valve 58 a "lifting" assistance as the pressurized gases from within the container flow through the valve assembly.

From the foregoing, it can be seen that the combination pressure-vacuum relief valve assembly 10 of the invention is of a simple construction and affords a very efficient mode of operation. In addition, the assembly is very simple to assemble. The entire structural combination, basically, involves providing a simple two-part, generally hollow pressure valve 58 movably mounted within a simple two-part, generally hollow valve housing 18. A vacuum relief valve 84 is movably mounted within the hollow pressure valve 58. Impingement flange 110 even assists in maintaining the pressure valve 58 open. The entire assembly, including the pressure valve seat 56 and the vacuum relief valve seat 88, and the pressure valve 58 and vacuum relief valve 84, as well as the coil springs 82 and 99, all are assembled and operable about a central axis indicated at 112 in FIG. 2, which corresponds to the center of port 12 through bung flange 16 within the container well 14. Each of housing body part 26, housing cap part 28, pressure valve body part 60, pressure valve cap part 62, vacuum relief valve 84 and actuating lever 20 can be individually, unitarily molded of plastic material.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A combination pressure-vacuum relief valve assembly for mounting in a port of a container, comprising:

a two-part, generally hollow valve housing defining a valve chamber and including a housing body part adapted for mounting in said port and having an inlet communicating with the container, and a housing cap part secured to the body part and defining an outlet therebetween;

a pressure valve seat on said housing body part surrounding the inlet;

a two-part, generally hollow pressure valve movably mounted within the valve chamber and including a valve body part for engaging the pressure valve seat and having a first vacuum relief passage communicating with the container through said inlet, and a valve cap part secured to the valve body part and including a second vacuum relief passage communicating with atmosphere through said outlet;

a first spring means in the pressure valve for yieldably biasing the pressure valve against the pressure valve seat;

a vacuum relief valve seat on said valve cap part surrounding the second vacuum relief passage;

a vacuum relief valve movably mounted within the pressure valve for engaging the vacuum relief valve seat; and a second spring means in the pressure valve for yieldably biasing the vacuum relief valve against the vacuum relief valve seat.

2. The combination pressure-vacuum relief valve of claim 1 wherein the center of said port defines a generally central axis of the valve assembly, the pressure valve seat and the vacuum relief valve seat being concentric with the axis, and the pressure valve and the vacuum relief valve being mounted for reciprocating movement on the axis.

3. The combination pressure-vacuum relief valve of claim 2 wherein said first and second spring means comprise coil springs mounted concentrically on the axis.

4. The combination pressure-vacuum relief valve of claim 1 wherein said valve housing and said pressure valve define a flow passage between the inlet and the outlet, and including impingement means on the pressure valve projecting into the flow passage and against which gas from the container impinges to assist in maintaining the pressure valve off the pressure valve seat.

5. The combination pressure-vacuum relief valve of claim 4 wherein said flow passage is of a given cross-sectional area, and said impingement means is of a size and configuration to considerably reduce said cross-sectional area.

6. The combination pressure-vacuum relief valve of claim 5 wherein said pressure valve seat and said pressure valve are circular, the flow passage is generally cylindrical, and the impingement means comprises an annular flange projecting radially outwardly of the pressure valve into the flow passage.

7. The combination pressure-vacuum relief valve of claim 1 wherein said vacuum relief valve includes a valve stem projecting through apertures in the valve cap part and the housing cap part to facilitate selective actuation of the vacuum relief valve from outside the valve assembly.

8. The combination pressure-vacuum relief valve of claim 7, including an actuating lever pivotally mounted between a pair of flanges on the outside of the housing cap part and engageable with the valve stem for operating the same, the flanges providing guiding support for opposite sides of the lever during its pivotal movement.

9. A combination pressure-vacuum relief valve assembly for mounting in a port of a container, comprising:

a generally hollow valve housing adapted for mounting in said port and defining a valve chamber with an inlet communicating with the container and an outlet communicating with atmosphere;

a pressure valve seat on said housing surrounding the inlet;

a generally hollow pressure valve movably mounted within the valve chamber and defining an interior cavity, the pressure valve being adapted for engaging the pressure valve seat and including a vacuum relief passage means communicating through the pressure valve between said inlet and outlet;

a first spring means operatively associated between the pressure valve and the valve housing for yieldably biasing the pressure valve against the pressure valve seat;

a vacuum relief valve seat on the pressure valve about the vacuum relief passage means;

a vacuum relief valve movably mounted within the interior cavity of the pressure valve for engaging the vacuum relief valve seat;

a second spring means operatively associated between the vacuum relief valve and the pressure valve for yieldably biasing the vacuum relief valve against the vacuum relief valve seat; and a shaft fixed at one end to said valve housing and extending into the interior cavity of the pressure valve, the shaft having a flange portion, with the first spring means being operatively associated between the flange portion and the inside of the pressure valve.

10. Combination pressure-vacuum relief valve assembly for mounting in a port of a container, comprising:

a generally hollow valve housing adapted for mounting in said port and defining a valve chamber with an inlet communicating with the container and an outlet communicating with atmosphere;

a pressure valve seat on said housing surrounding the inlet;

a generally hollow pressure valve movably mounted within the valve chamber and defining an interior cavity, the pressure valve being adapted for engaging the pressure valve seat and including a vacuum relief passage means communicating through the pressure valve between said inlet and outlet;

a first spring means operatively associated between the pressure valve and the valve housing for yieldably biasing the pressure valve against the pressure valve seat;

a vacuum relief valve seat on the pressure valve about the vacuum relief passage means;

a vacuum relief valve movably mounted within the interior cavity of the pressure valve for engaging the vacuum relief valve seat;

a second spring means operatively associated between the vacuum relief valve and the pressure valve for yieldably biasing the vacuum relief valve against the vacuum relief valve seat;

a valve stem projecting through apertures in the pressure valve and the valve housing to facilitate selective actuation of the vacuum relief valve from outside the valve assembly; and an actuator lever pivotally mounted between a pair of flanges on the outside of the valve housing and engageable with the valve stem for operating the same, the flanges providing guiding support for opposite sides of the lever during its pivotal movement.

* * * * *